US012631119B1

(12) United States Patent
Adali et al.

(10) Patent No.: US 12,631,119 B1
(45) Date of Patent: May 19, 2026

(54) ASYMMETRIC BLADE LOCKING APPARATUS

(71) Applicant: GE Marmara Technology Center Muhendislik Hizmetleri Ltd, Gebze (TR)

(72) Inventors: Necip Adali, Istanbul (TR); Ersen Hatipoglu, Istanbul (TR); David A Goshorn, Evendale, OH (US); Vedat Alkan, Istanbul (TR)

(73) Assignee: GE Marmara Technology Center Muhendislik Hizmetleri Ltd., Gebze (TR)

( * ) Notice: Subject to any disclaimer, the term of this patent is extended or adjusted under 35 U.S.C. 154(b) by 0 days.

(21) Appl. No.: 19/231,201

(22) Filed: Jun. 6, 2025

(51) Int. Cl.
*F01D 5/32* (2006.01)

(52) U.S. Cl.
CPC ............ *F01D 5/32* (2013.01); *F05D 2240/80* (2013.01); *F05D 2260/31* (2013.01)

(58) Field of Classification Search
CPC ............ F01D 5/32; F01D 5/323; F01D 5/326; F05D 2240/80
See application file for complete search history.

(56) References Cited

U.S. PATENT DOCUMENTS 3,088,708 A * 5/1963 Feinberg ............... F01D 5/3038 416/215
3,193,185 A 7/1965 Erwin et al.
3,375,971 A 4/1968 Fitton
4,050,850 A * 9/1977 Beckershoff ............ F01D 5/326 416/193 A
6,752,598 B2 * 6/2004 Antunes ................ F01D 5/3038 416/220 R
7,878,762 B2 2/2011 Suciu et al.
8,414,268 B2 * 4/2013 Aiello ................... F01D 5/3038 416/216
8,967,966 B2 3/2015 Boston et al.
9,453,422 B2 9/2016 Hile et al.
9,664,054 B2 * 5/2017 Milne ..................... F04D 19/02
10,066,487 B2 * 9/2018 Remy ................... F01D 5/3038
(Continued)

FOREIGN PATENT DOCUMENTS

WO WO-2012110735 A1 * 8/2012 ........... F04D 29/322

*Primary Examiner* — Christopher R Legendre
(74) *Attorney, Agent, or Firm* — Hanley, Flight & Zimmerman, LLC

(57) ABSTRACT

An example apparatus includes a first platform including a first inner radial surface and a first circumferential edge, a first dovetail extending from the first inner radial surface, a second platform including a second inner radial surface and a second circumferential edge, the second circumferential edge adjacent the first circumferential edge, a second dovetail extending from the second inner radial surface, and a locking lug including a radial hole to receive a screw to be positioned between the first circumferential edge and the second circumferential edge in a circumferential direction, the locking lug including a first circumferential surface and a second circumferential surface, the first circumferential surface in contact with the first dovetail, the second circumferential surface in contact with the second dovetail, the first circumferential surface positioned closer than the second circumferential surface to the radial hole in the circumferential direction.

16 Claims, 9 Drawing Sheets

(56) References Cited

U.S. PATENT DOCUMENTS

| | | | |
|---|---|---|---|
| 10,107,114 B2 * | 10/2018 | Aiello | F01D 5/32 |
| 11,149,552 B2 | 10/2021 | DiPietro et al. | |
| 11,401,824 B2 | 8/2022 | Breeze-Stringfellow et al. | |
| 11,959,393 B2 * | 4/2024 | Ray | F01D 5/143 |
| 12,221,899 B2 | 2/2025 | Ganiger et al. | |
| 2016/0186772 A1 | 6/2016 | DiPietro, Jr. et al. | |
| 2016/0186773 A1 | 6/2016 | DiPietro et al. | |
| 2017/0114796 A1 | 4/2017 | DiPietro et al. | |
| 2018/0334921 A1 | 11/2018 | Carugno | |

* cited by examiner

ASYMMETRIC BLADE LOCKING APPARATUS

STATEMENT REGARDING GOVERNMENT SUPPORT

The work leading to this invention has received funding from the European Union (EU) Open Fan for Environmental Low Impact of Aviation (OFELIA) project. In particular, this invention was made with government support under OFELIA Grant agreement ID: 101102011 funded by the EU.

FIELD OF THE DISCLOSURE

This disclosure relates generally to aircraft engines and, more particularly, to asymmetric blade locking apparatus.

BACKGROUND

Many gas turbine engines include a rotor assembly that includes a rotor disk and an array of rotor blades that extend radially outward from a perimeter of the rotor disk. The rotor blades may be formed separately from the rotor disk and then attached thereto. In particular, in some applications, the rotor blades may be inserted into a rim slot disposed along a circumference of a rotor disk. In many instances, it may be beneficial to retain the array of rotor blades in a fixed circumferential arrangement such that the rotor disk and the array of rotor blades rotate together in the fixed arrangement.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Figure 1:
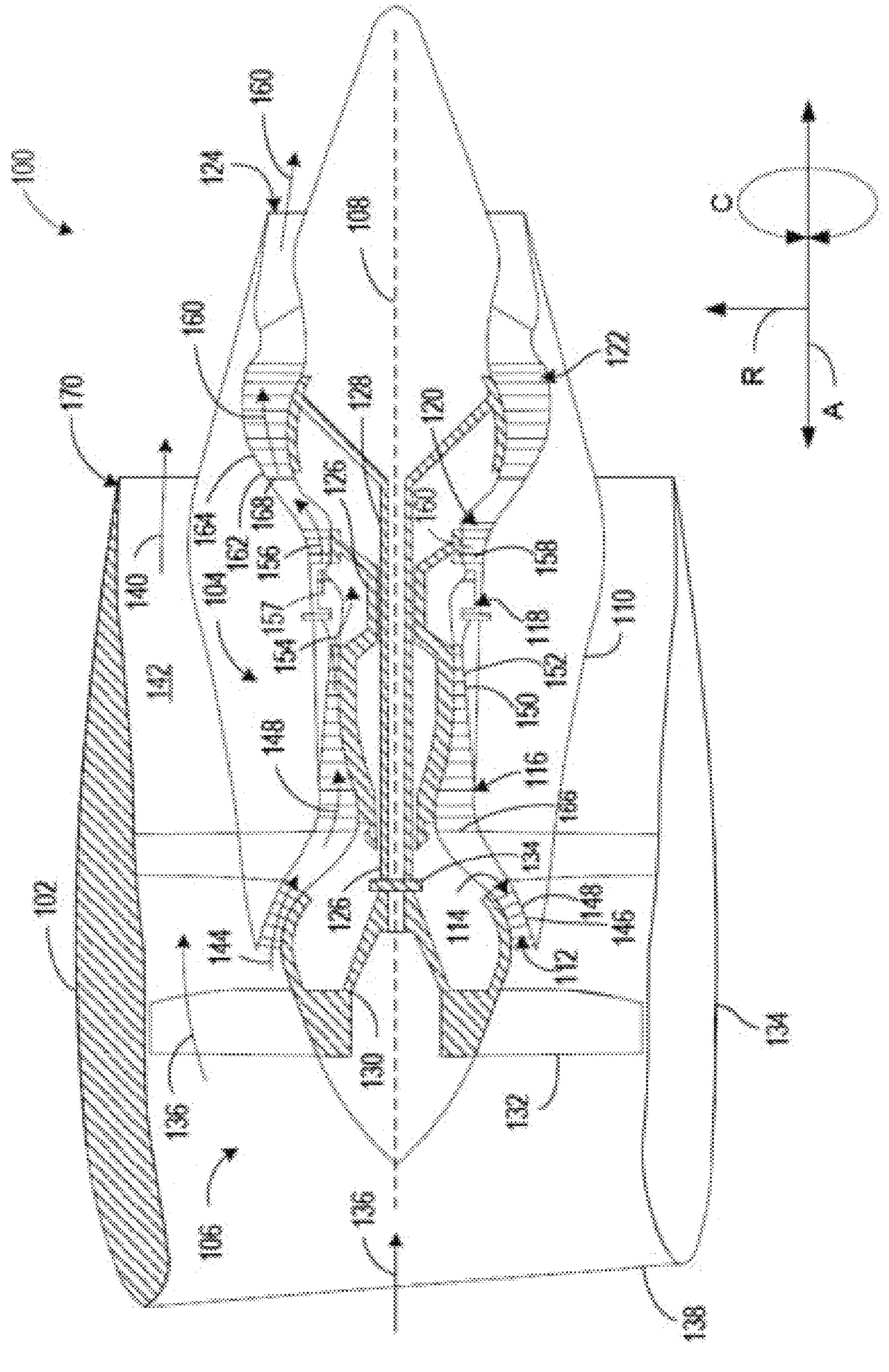
FIG. 1 is a schematic cross-sectional view of an example gas turbine engine in which an asymmetric blade locking assembly in accordance with teachings disclosed herein can be implemented.

As used herein, the terms “dovetail” or “dovetail shape” refer to structures or shapes having a relative wide portion that tapers to a relatively narrow portion in the radial direction.

As used herein, the terms “axial” and “axially” refer to directions and orientations that extend substantially parallel to a centerline of a turbine engine. Moreover, the terms “radial” and “radially” refer to directions and orientations that extend substantially perpendicular to the centerline (e.g., a rotational axis) of the turbine engine. In addition, as used herein, the terms “circumferential” and “circumferentially” refer to directions and orientations that extend arcuately about the centerline of the turbine engine.

The terms “forward” and “aft” refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, a “radius” of a feature of an airfoil refers to a distance from an axial centerline (e.g., an axis of rotation) of an unducted propulsion system to the feature of the airfoil in a direction perpendicular to the axial centerline (i.e., a radial direction).

The terms “upstream” and “downstream” refer to the relative direction with respect to fluid flow in a fluid pathway. For example, “upstream” refers to the direction from which the fluid flows, and “downstream” refers to the direction to which the fluid flows.

“Including” and “comprising” (and all forms and tenses thereof) are used herein to be open ended terms. Thus, whenever a claim employs any form of “include” or “comprise” (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase “at least” is used as the transition term in, for example, a preamble of a claim, it is open-ended in the same manner as the term “comprising” and “including” are open ended. The term “and/or” when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase “at least one of A and B” is intended to refer to implementations including any of (1) at least one A, (2) at least one B, or (3) at least one A and at least one B. Similarly, as used herein in the context of describing structures, components, items, objects and/or things, the phrase “at least one of A or B” is intended to refer to implementations including any of (1) at least one A, (2) at least one B, or (3) at least one A and at least one B. As used herein in the context of describing the performance or execution of processes, instructions, actions, activities, etc., the phrase “at least one of A and B” is intended to refer to implementations including any of (1) at least one A, (2) at least one B, or (3) at least one A and at least one B. Similarly, as used herein in the context of describing the performance or execution of processes, instructions, actions, activities, etc., the phrase “at least one of A or B” is intended to refer to implementations including any of (1) at least one A, (2) at least one B, or (3) at least one A and at least one B.

As used herein, singular references (e.g., “a”, “an”, “first”, “second”, etc.) do not exclude a plurality. The term “a” or “an” object, as used herein, refers to one or more of that object. The terms “a” (or “an”), “one or more”, and “at least one” are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

Examples disclosed herein enable blade platforms to come together (e.g., be in contact) at a circumferential position that unevenly divides a circumferential gap between adjacent dovetails, which extend radially inward from the blade platforms and couple to a rotating disc. In some examples, an asymmetric locking lug is coupled to a set screw that extends from the disc to an orifice between the blade platforms. Specifically, the locking lug can be asymmetric on opposite sides of a hole through which the set screw extends in a circumferential direction defined by an engine including the blade platforms. The asymmetric locking lug contacts the adjacent dovetails to maintain a relative circumferential position of the dovetails. For example, the locking lug can include a longer circumferential side to contact a first dovetail, and a shorter circumferential side to contact a second dovetail. Thus, the locking lug enables the blade platforms to meet at a circumferential location that unevenly splits the circumferential gap between the dovetails.

Further, the asymmetric locking lug is structured to position a center of gravity of the locking lug aligned with a longitudinal axis of the set screw. For example, a longer circumferential side of the asymmetric locking lug can include a recess and/or a shortened axial length relative to a shorter circumferential side of the locking lug positioned on an opposite side of the longitudinal axis in the circumferential direction. As such, the structure of the locking lug prevents the locking lug from encountering a moment at either end of the set screw that would otherwise dislodge the locking lug.

Some examples include a locking lug that is symmetrical on opposite circumferential sides of the longitudinal axis. In such examples, a central axis of the symmetric locking lug (e.g., the longitudinal axis of the set screw coupled to the locking lug) is still aligned with the circumferential position at which the blade platforms come together and unevenly divide the circumferential gap between the adjacent dovetails. In such examples, one of the adjacent dovetails includes a circumferential protrusion to contact a surface of the symmetric locking lug.

Referring now to the drawings, FIG. 1 is a schematic cross-sectional view of an example gas turbine engine 100 that can include example blade locking assemblies in accordance with examples disclosed herein. The example gas turbine engine 100 can be implemented on an aircraft and therefore referred to as an aircraft engine. In this example, the gas turbine engine 100 is a turbofan-type of engine. However, the principles of the present disclosure are also applicable to other types of engines, such as turboprop engines and engines without a nacelle, such as unducted fan (UDF) engines (sometimes referred to as propfans). Further, the examples disclosed herein can be implemented on other types of gas turbines, such as non-aircraft engines and/or power generators.

As shown in FIG. 1, the gas turbine engine 100 includes an outer bypass duct 102 (which may also be referred to as a nacelle, fan duct, or outer casing), a core turbine engine 104, and a fan section 106. The core turbine engine 104 and the fan section 106 are disposed at least partially in the outer bypass duct 102. The core turbine engine 104 is disposed downstream from the fan section 106 and drives the fan section 106 to produce forward thrust.

As shown in FIG. 1, the gas turbine engine 100 defines a longitudinal or axial centerline axis 108 extending therethrough for reference. FIG. 1 also includes an annotated directional diagram with reference to an axial direction A, a radial direction R, and a circumferential direction C. In general, as used herein, the axial direction A is a direction that extends generally parallel to the axial centerline axis 108, the radial direction R is a direction that extends orthogonally outward from or inward toward the axial centerline axis 108, and the circumferential direction C is a direction that extends concentrically around the axial centerline axis 108. Further, as used herein, the term "forward" refers to a direction along the centerline axis 108 in the direction of movement of the gas turbine engine 100, such as to the left in FIG. 1, while the term "rearward" refers to a direction along the centerline axis 108 in the opposite direction, such as to the right in FIG. 1.

The core turbine engine 104 includes an outer casing 110 (which may also be referred to as a mid-casing), which is substantially tubular and defines an annular inlet 112. The outer casing 110 of the core turbine engine 104 can be formed from a single casing or multiple casings. The outer casing 110 encloses, in serial flow relationship, a compressor section having a booster or low pressure compressor 114

("LP compressor 114") and a high pressure compressor 116 ("HP compressor 116"), a combustor 118 (e.g., a combustion section), a turbine section having a high pressure turbine 120 ("HP turbine 120") and a low pressure turbine 122 ("LP turbine 122"), and an exhaust section 124.

The core turbine engine 104 includes a high pressure shaft 126 ("HP shaft 126") that drivingly couples the HP turbine 120 and the HP compressor 116. The core turbine engine 104 also includes a low pressure shaft 128 ("LP shaft 128") that drivingly couples the LP turbine 122 and the LP compressor 114. The LP shaft 128 also couples to a fan shaft 130.

The fan section 106 includes a plurality of fan blades 132 that are coupled to and extend radially outward from the fan shaft 130. In some examples, the LP shaft 128 may couple directly to the fan shaft 130 (i.e., a direct-drive configuration). In alternative configurations, the LP shaft 128 may couple to the fan shaft 130 via a reduction gear 134 (i.e., an indirect-drive or geared-drive configuration). While in this example the core turbine engine 104 includes two compressors and two turbines, in other examples, the core turbine engine 104 may only include one compressor and one turbine. Further, in other examples, the core turbine engine 104 can include more than two compressors and turbines. In such examples, the core turbine engine 104 may include more than two drive shafts or spools.

As illustrated in FIG. 1, during operation of the gas turbine engine 100, air 136 enters an inlet portion 138 of the gas turbine engine 100. The air 136 is accelerated by the fan blades 132. A first portion 140 of the air 136 flows into a bypass airflow passage 142, while a second portion 144 of the air 136 flows into the annular inlet 112 of the core turbine engine 104 (and, thus, into the LP compressor 114). Downstream of the annular inlet 112, one or more sequential stages of LP compressor stator vanes 146 and LP compressor rotor blades 148 coupled to the LP shaft 128 progressively compress the second portion 144 of the air 136 flowing through the LP compressor 114 en route to the HP compressor 116. Next, one or more sequential stages of HP compressor stator vanes 150 and HP compressor rotor blades 152 coupled to the HP shaft 126 further compress the second portion 144 of the air 136 flowing through the HP compressor 116. This provides compressed air 154 to the combustor 118 where it mixes with fuel and burns to provide combustion gases 156. Fuel is injected into the combustor 118 by one or more nozzles 157. The gas turbine engine 100 includes a compressor frame 166 to support a forward portion of the core turbine engine 104. The LP compressor rotor blades 148 can be coupled to the LP shaft 128 and/or the HP compressor rotor blades 152 can be coupled to the HP shaft 126 via a blade locking assembly, as discussed in further detail in connection with FIGS. 2-9.

The combustion gases 156 flow through the HP turbine 120 where one or more sequential stages of HP turbine stator vanes 158 and HP turbine rotor blades 160 coupled to the HP shaft 126 extract a first portion of kinetic and/or thermal energy. This energy extraction supports operation of the HP compressor 116. The combustion gases 156 then flow through the LP turbine 122 where one or more sequential stages of LP turbine stator vanes 162 and LP turbine rotor blades 164 coupled to the LP shaft 128 extract a second portion of thermal and/or kinetic energy therefrom. This energy extraction causes the LP shaft 128 to rotate, which supports operation of the LP compressor 114 and/or rotation of the fan shaft 130. The combustion gases 156 then exit the core turbine engine 104 through the exhaust section 124 thereof. The combustion gases 156 mix with the first portion 140 of the air 136 from the bypass airflow passage 142. The combined gases exit an exhaust nozzle 170 (e.g., a converging/diverging nozzle) of the bypass airflow passage 142 to produce propulsive thrust. The gas turbine engine 100 includes a turbine frame 168 to support an aft portion of the core turbine engine 104. In some examples, the turbine frame 168 is positioned downstream of the LP turbine 122. The HP turbine rotor blades 160 can be coupled to the HP shaft 126 and/or the LP turbine rotor blades 164 can be coupled to the LP shaft 128 via a blade locking assembly, as discussed in further detail in connection with FIGS. 2-9.

It should be appreciated that the example gas turbine engine 100 depicted in FIG. 1 is by way of example only, and that in other examples, the gas turbine engine 100 may have any other suitable configuration. Accordingly, it will be appreciated that in other examples, the gas turbine engine 100, which is configured as a turbofan engine in FIG. 1, may instead be configured as, e.g., a turbojet engine, a turboshaft engine, a turboprop engine, etc.

Figure 2:
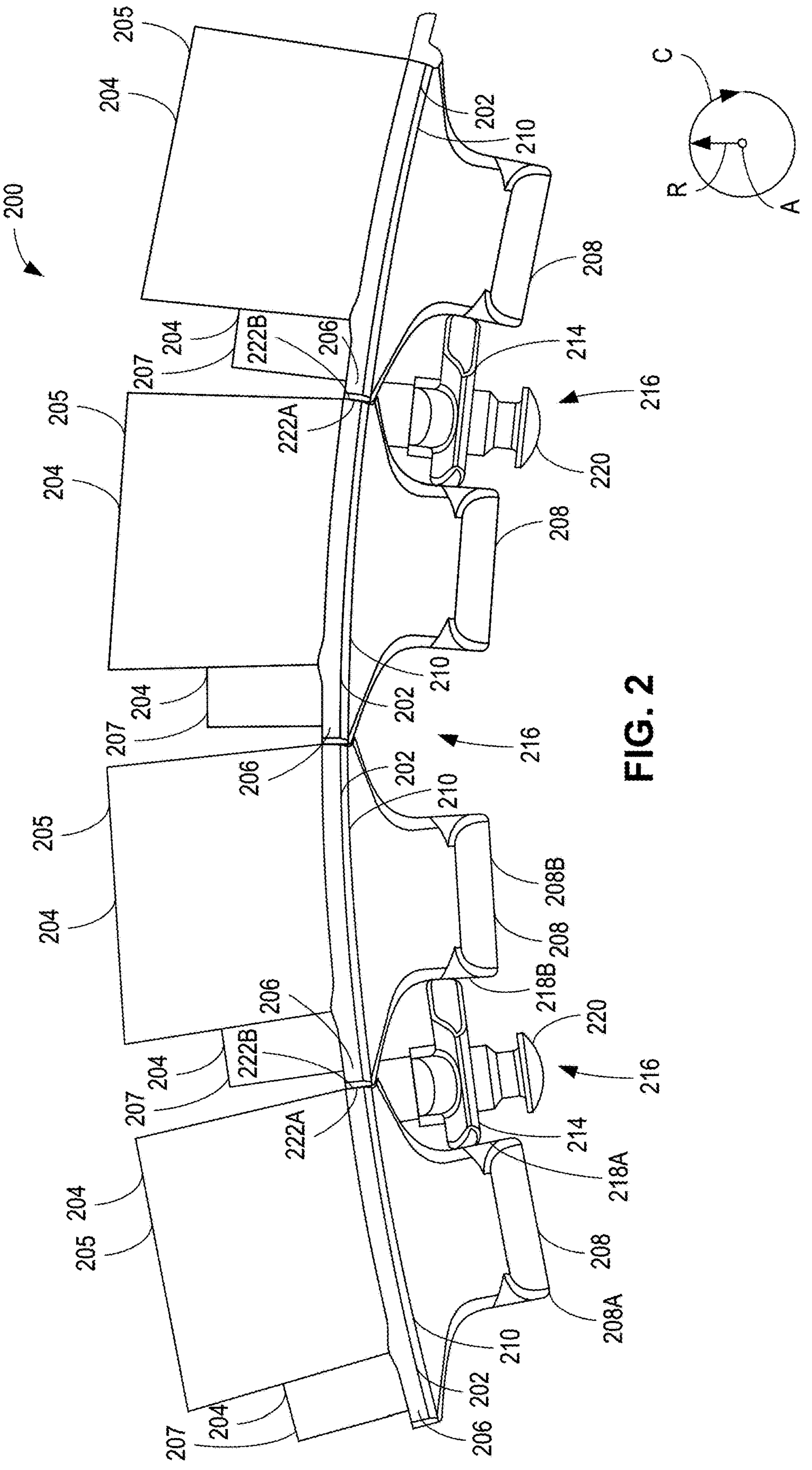
FIG. 2 shows an aft-looking-forward view of a portion of an asymmetric blade locking assembly that can be implemented in the engine of FIG. 1.
Figure 3:
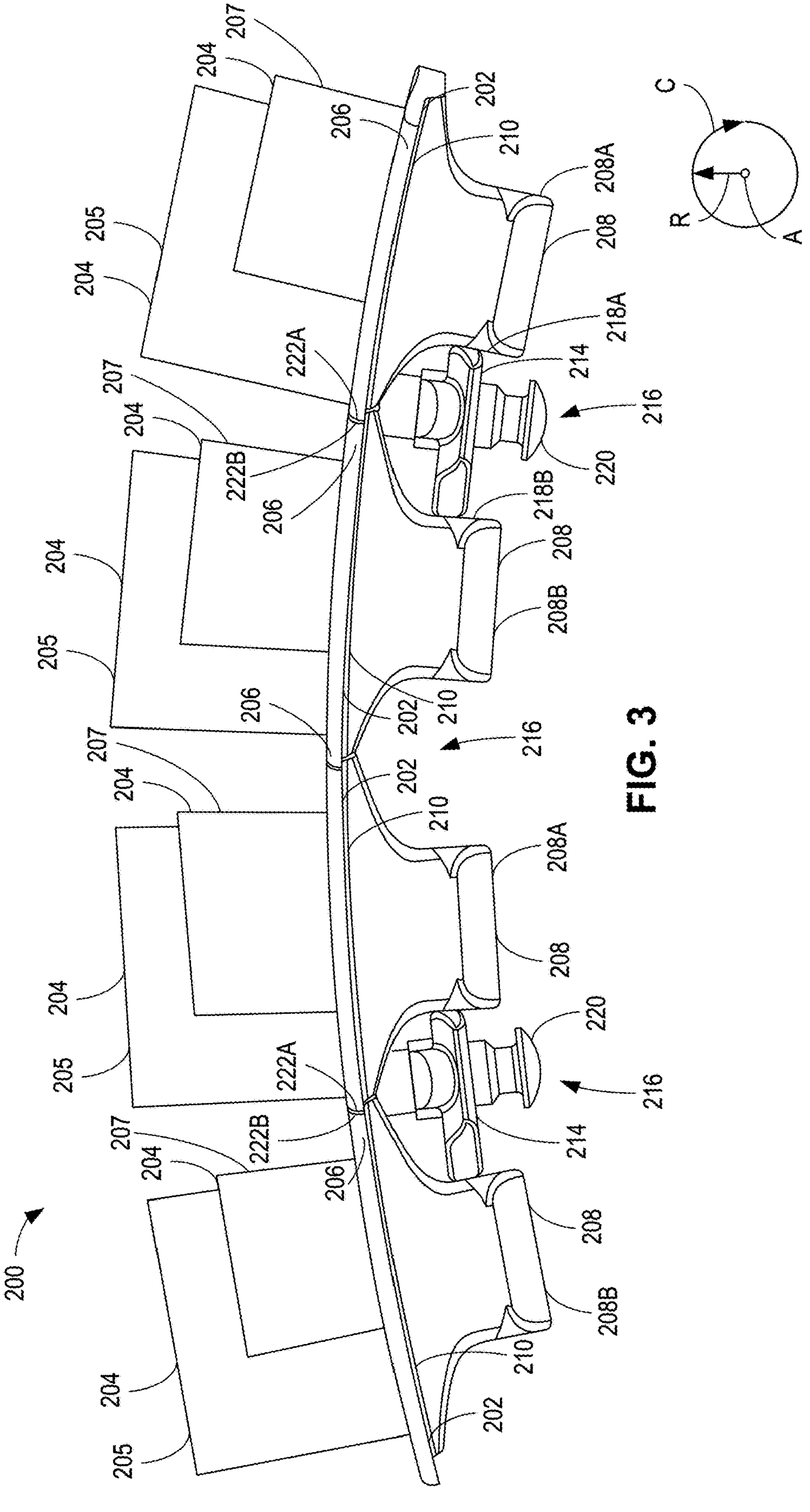
FIG. 3 shows a forward-looking-aft view of the blade locking assembly of FIG. 2.
Figure 4:
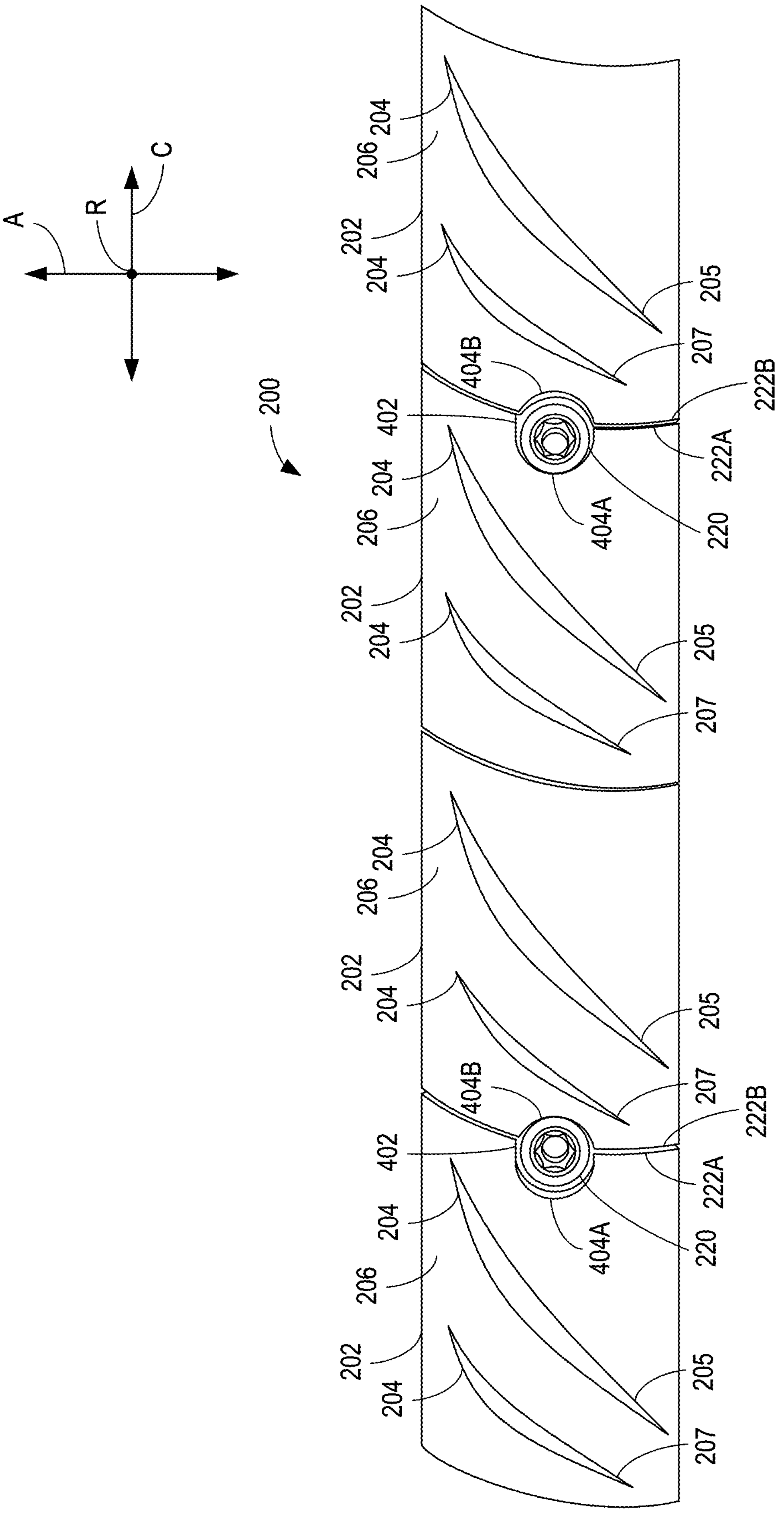
FIG. 4 shows a radially inward view of the blade locking assembly of FIGS. 2-3.
Figure 5:
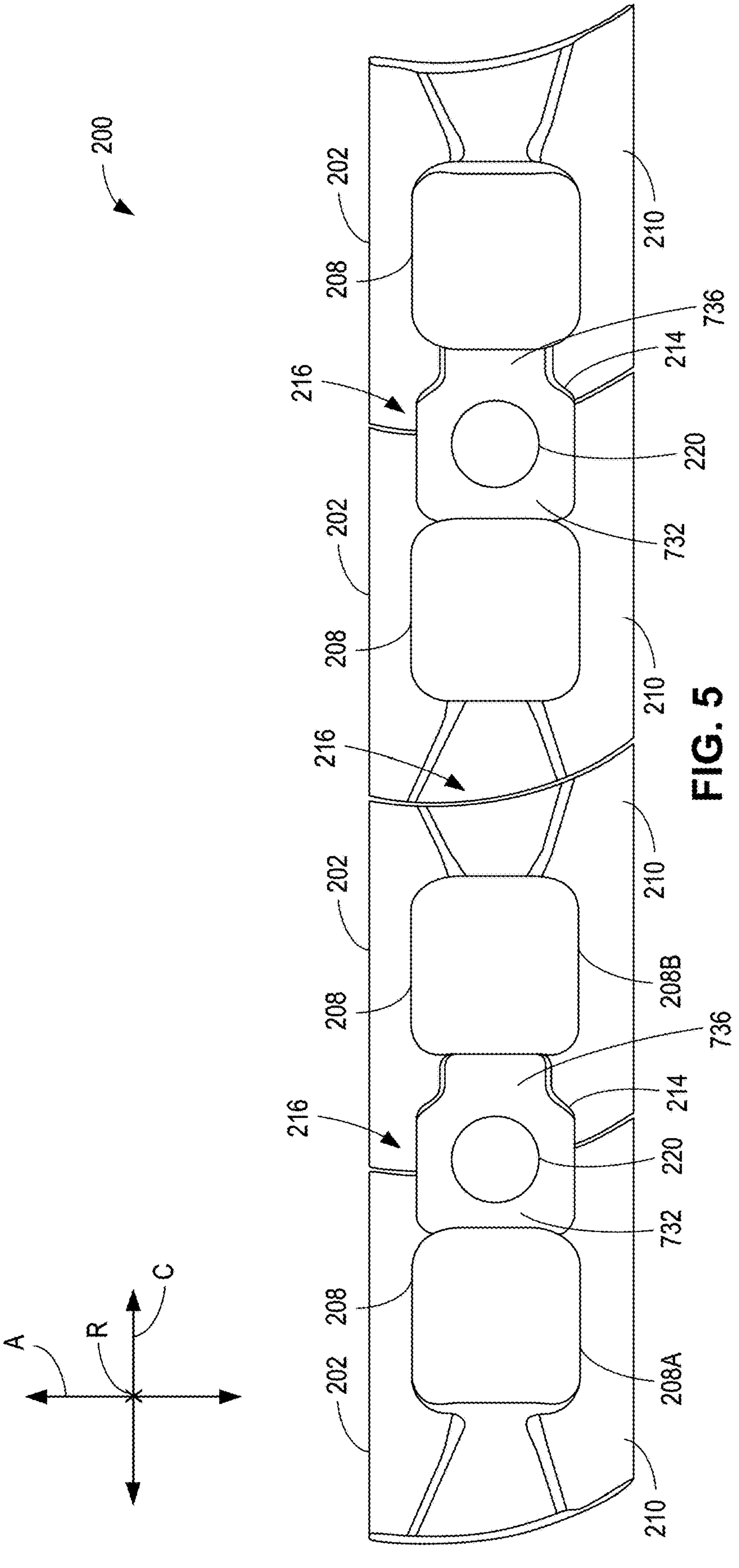
FIG. 5 shows a radially outward view of the blade locking assembly of FIGS. 2-4.

FIGS. 2-5 illustrate a portion of an example blade locking assembly 200 (e.g., an asymmetric blade locking apparatus) that can be implemented in the engine 100 of FIG. 1 in accordance with the teachings disclosed herein. FIG. 2 shows an aft-looking-forward view of the blade locking assembly 200; FIG. 3 shows a forward-looking-aft view of the blade locking assembly 200; FIG. 4 shows a radially inward view of the blade locking assembly 200; and FIG. 5 shows a radially outward view of the blade locking assembly 200.

In the illustrated example of FIGS. 2-5, the blade locking assembly 200 includes a plurality of platforms 202 (e.g., a circumferential row of platforms). As shown in FIGS. 2-4, the blade locking assembly 200 includes blades 204 extending from an outer radial surface 206 of the platforms 202. As shown in FIGS. 2-3 and 5, the blade locking assembly 200 includes dovetails 208 extending from an inner radial surface 210 of the platforms 202. The blades 204 can correspond to the LP compressor rotor blades 148, the HP compressor rotor blades 152, the HP turbine rotor blades 160, and/or the LP turbine rotor blades 164 of FIG. 1. Accordingly, the blades 204 depicted form a portion of a row of annular rotor blades extending from consecutive platforms 202 (e.g., adjacent platforms in the circumferential direction C) in the engine 100 of FIG. 1.

In this example, as shown in FIGS. 2-4, the blades 204 include a main blade 205 and a splitter blade 207 extending from each of the platforms 202. In this example, the blades 204 are staggered for clockwise rotation (e.g., in the aft-looking-forward perspective of FIG. 2). Alternatively, the blades 204 can be configured for counterclockwise rotation (e.g., in the aft-looking-forward perspective of FIG. 2). Additionally, the blade locking assembly 200 can alternatively include a different number of the blades 204 extending from each of the platforms 202. For example, the blade locking assembly 200 can include only the main blade 205 extending from the platform 202 or only the splitter blade 207. Alternatively, the blade locking assembly 200 can include more than two of the blades 204 extending from each of the platforms 202.

To couple the platforms 202 and, in turn, the blades 204 to the HP shaft 126 and/or the LP shaft 128 of FIG. 1, the dovetails 208 are positioned within a rim slot along a circumference of a rotor disk associated with the HP shaft 126 and/or the LP shaft 128. To inhibit relative movement between the dovetails 208, and, in turn, the platforms 202 and the blades 204, the blade locking assembly 200 includes locking lugs 214 (FIGS. 2-3 and 5) in contact with the dovetails 208. Specifically, the locking lugs 214 are positioned in alternating gaps 216 (e.g., every other of the gaps 216 in the circumferential direction C) between adjacent dovetails 208. As shown in FIGS. 2-3, the locking lugs 214 contact circumferential surfaces 218A, 218B (e.g., surfaces that face the circumferential direction C, circumferentially facing surfaces) of adjacent dovetails 208A, 208B. The circumferential surfaces 218A, 218B face opposite directions along the circumferential direction C (e.g., clockwise and counterclockwise) and, thus, face each other.

Figure 6:
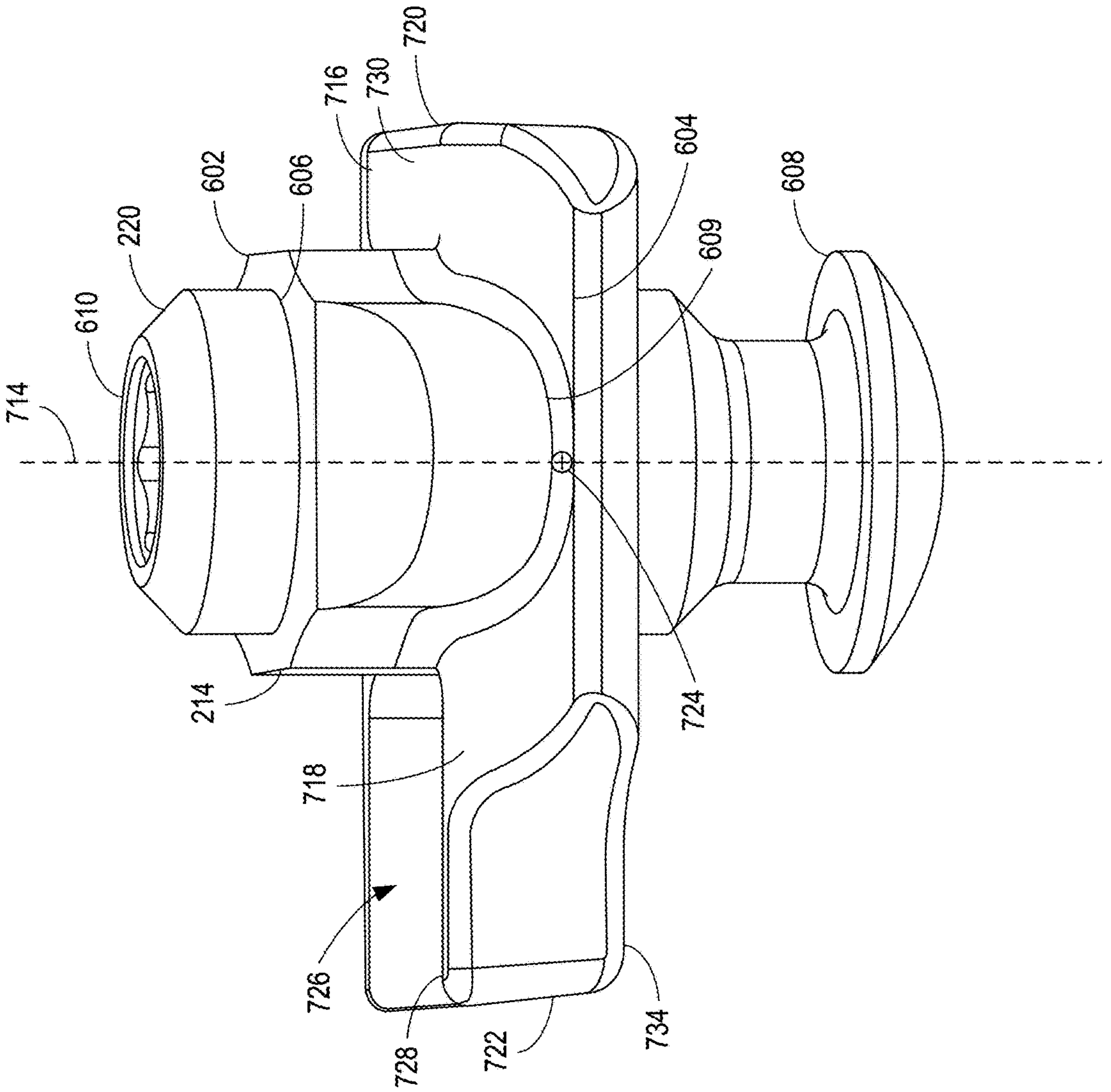
FIG. 6 shows a first isolated perspective view of an example locking lug of the blade locking assembly of FIGS. 2-5.
Figure 7:
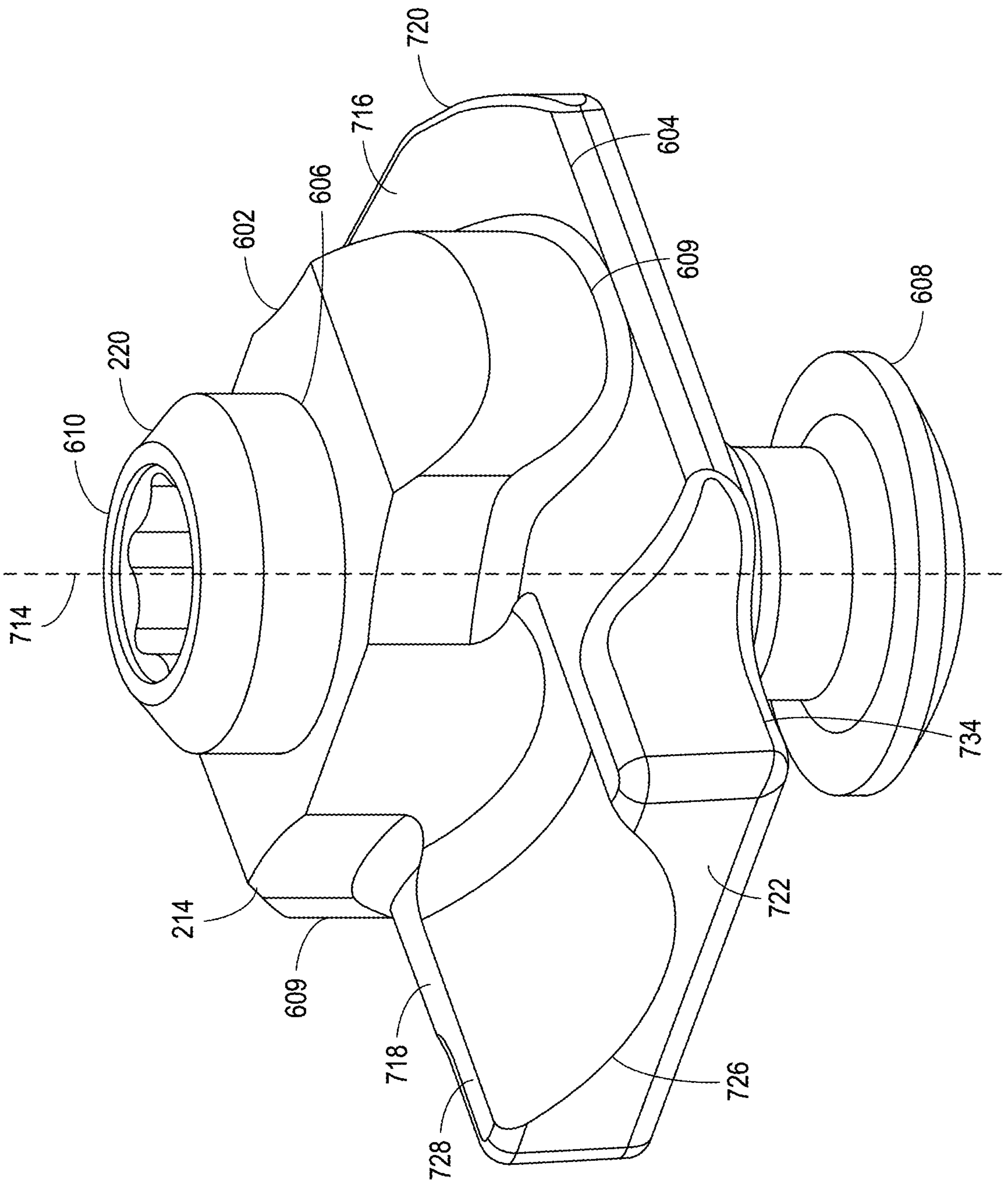
FIG. 7 shows a second isolated perspective view of the example locking lug of the blade locking assembly of FIGS. 2-5.

Additionally, as shown in FIGS. 2-5, the blade locking assembly 200 includes radial set screws 220. FIGS. 6 and 7 illustrate isolated perspective views of one of the locking lug 214 of FIGS. 2-5 and the radial set screws 220. The locking lugs 214 include a tower 602 (e.g., a radially outward projection) extending radially outward from a first portion 604 (e.g., a mid-portion) of the locking lug 214. The tower 602 and the first portion 604 of the locking lug 214 define a radial hole 606 (e.g., a radial orifice) to receive the radial set screw 220. Specifically, a first end 608 (e.g., a radially inward end) of the radial set screw 220 contacts the disc associated with the HP shaft 126 or the LP shaft 128 that couples to the dovetails 208. As the radial set screw 220 rotates, the locking lug 214 moves radially outward to cause corners of the locking lug 214 to contact pressure faces of the disc. The contact between the corners of the locking lug 214 and the pressure faces of the disc form a primary locking mechanism to position the locking lug 214 on the disc. Additionally, the tower 602 of the locking lug 214 defines a forward-aft extruded region 609 (e.g., positioned forward and aft of the radial set screw 220 and aligned with the radial set screw in the circumferential direction C). The forward-aft extruded region 609 is positioned in a recess of the disc associated with the HP shaft 126 or the LP shaft 128 to inhibit circumferential movement of the locking lug 214 and form a secondary locking mechanism.

Further, a second end 610 of the radial set screw 220 extends to an opening 402 defined between circumferential edges 222A, 222B of adjacent platforms 202A, 202B, as shown in FIG. 4. Specifically, the circumferential edges 222A, 222B include cut-outs 404A, 404B to provide clearance for the second end 610 of the radial set screw 220. Accordingly, the second end 610 of the radial set screw 220 can define a portion of a boundary of the flow path of the air 136 in the core turbine engine 104 of FIG. 1, with the outer radial surfaces 206 of the platforms 202. Thus, the second end 610 of the radial set screw 220 can be flush with the outer radial surfaces 206. In some examples, the tower 602 extends to the opening 402 and is flush with the outer radial surfaces 206 of the platforms 202, similar to the radial set screw 220. In this example, the locking lugs 214, advantageously, enable the circumferential edges 222A, 222B of the adjacent platforms 202A, 202B to unevenly divide the gap 218 between the adjacent dovetails 208A, 208B in the circumferential direction C.

Figure 8:
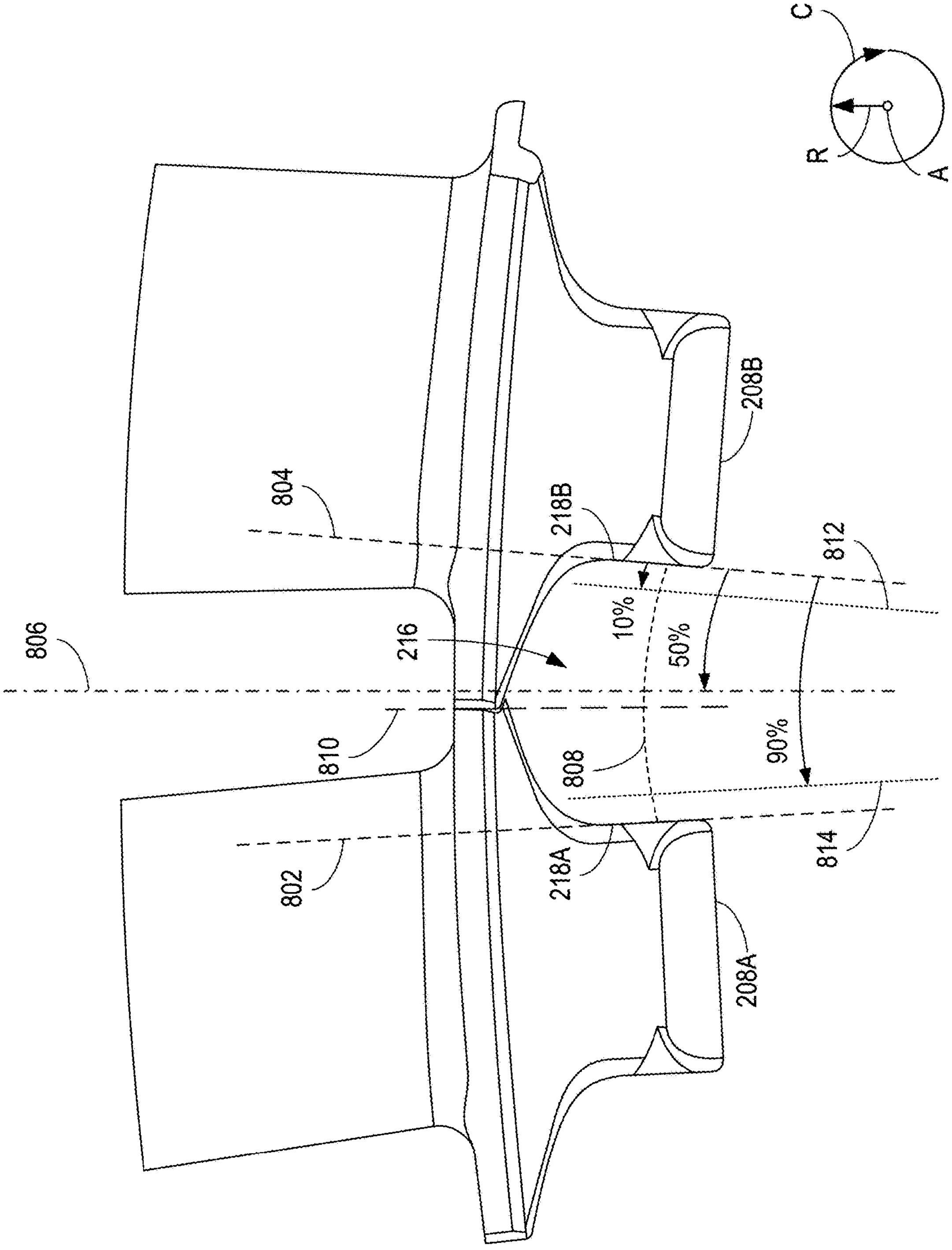
FIG. 8 shows an isolated view of adjacent blade platforms of the blade locking assembly of FIGS. 2-5.

FIG. 8 is a schematic illustration of the gap 216 between the adjacent dovetails 208A, 208B. In FIG. 8, the circumferential surface 218A of the first dovetail 208A defines a first geometric plane 802, and the circumferential surface 218B of the second dovetail 208B defines a second geometric plane 804. In FIG. 8, a centerline 806 evenly divides an arc 808 between the geometric planes 802, 804 (e.g., extending from the first geometric plane 802 to the second geometric plane 804). A platform opening geometric plane 810 spans in the radial direction R and the axial direction A and is aligned with the opening 402 (FIG. 4) defined between the circumferential edges 222A, 222B of adjacent platforms 202A, 202B.

As shown in FIG. 8, the platform opening geometric plane 810 does not align with the centerline 806 of the gap 218 in the circumferential direction C. For example, circumferential clocking of the blades 204 to balance stresses encountered at the dovetail 208 can result in the platform opening geometric plane 810 occupying a different circumferential position than the centerline 806. In some examples, such circumferential clocking is beneficial when two or more of the blades 204 (e.g., the main blade 205 and the splitter blade 207) extend from the same platform 202. In some examples, such circumferential clocking is beneficial when one of the blades 204 (e.g., only the main blade 205) extends from the platform 202.

Advantageously, the locking lugs 214 enable the platform opening geometric plane 810 to be positioned at different locations along the arc 808 within 40% of a span of the arc 808 from the centerline 806 in either direction (e.g., clockwise and counterclockwise). Specifically, the platform opening geometric plane 810 can be aligned with or positioned between a 10% radial geometric plane 812 (e.g., at 10% of the span of the arc 808 from the second circumferential surface 218B towards the first circumferential surface 218A) and a 90% geometric plane 814 (e.g., at 90% of the span of the arc 808 from the second circumferential surface 218B towards the first circumferential surface 218A) while still enabling preferred circumferential clocking of the blades 204 (e.g., for stress balance and frequency tuning).

Returning to the illustrated examples of FIGS. 6-7, the locking lug 214 and the radial set screw 220 define a set screw axis 714, which also corresponds to a central axis of the radial hole 606. Accordingly, the set screw axis 714 spans in the radial direction R (FIGS. 1-5 and 8). As the radial set screw 220 extends to the opening 402 (FIG. 4) between the platforms 202A, 202B, the set screw axis 714 aligns with the platform opening geometric plane 810 (FIG. 8) in the circumferential direction C (FIGS. 1-5 and 8). Thus, the set screw axis 714 is offset from the centerline 806 in the circumferential direction C, similar to the platform opening geometric plane 810. In some examples, space is maintained between the tower 602 and the circumferential surfaces 218A, 218B in the circumferential direction C during operation. Accordingly, the tower 602 is separated from the first circumferential surface 218A and the second circumferential surface 218B by different distances in the circumferential direction C (e.g., at a radius of the tower 602).

To enable the circumferential edges 222A, 222B of the adjacent platforms 202A, 202B to unevenly split the gap 218 between the dovetails 208A, 208B in the circumferential direction C, the locking lugs 214 include a second portion 716 (e.g., a shorter circumferential portion) and a third portion 718 (e.g., a longer circumferential portion) that extend different distances from the first portion 704 (e.g., in the circumferential direction C). Specifically, the second portion 716 of the locking lugs 214 includes a first circumferential surface 720 (e.g., a first circumferential end of the locking lugs 214), and the third portion 718 of the locking lugs 214 includes a second circumferential surface 722 (e.g., a second circumferential end of the locking lugs 214). The first circumferential surface 720 is in contact with the first dovetail 208A (FIGS. 2-3 and 5), and the second circumferential surface 722 is in contact with the second dovetail 208B. The first circumferential surface 720 is positioned closer than the second circumferential surface 722 to the radial hole 606 (e.g., the set screw axis 714) in the circumferential direction C to enable the circumferential surfaces 720, 722 to extend to and contact the circumferential surfaces 218A, 218B of the dovetails 208A, 208B.

To prevent the locking lug 214 from dislodging when centripetal forces are encountered as the blades 204 rotate during engine operations, the locking lug 214 is configured to position a center of gravity 724 (FIG. 6) of the locking lug 214 in a same location in the circumferential direction C as the set screw axis 714. Accordingly, the center of gravity 724 of the locking lug 214 is offset from the centerline 806 between the dovetails 208A, 208B. As such, the locking lug 214 does not encounter a moment about the first end 608 or the second end 610 of the locking lug 214 that would otherwise dislodge the locking lug 214 and enable relative movement between the dovetails 208A, 208B when the blades 204 rotate.

To configure the center of gravity 724 to align with the set screw axis 714, the third portion 718 of the locking lug 214 is at least partially hollow to reduce a mass per unit of distance spanned in the circumferential direction C of the third portion 718. That is, the second portion 716 of the locking lug 214 is heavier than the third portion 718 per unit of circumferential span. Specifically, in the illustrated example of FIGS. 6-7, the third portion 718 of the locking lugs 214 includes a recess 726 (e.g., a notch, an indent, a depression, etc.) in a radially outward facing surface 728 of the third portion 718. In this example, at least a portion of the recess 726 aligns with the radial hole 606 in the axial direction A. Conversely, the second portion 716 of the locking lug 214 is full (e.g., does not include a recess) between an outer radial surface 730 (FIG. 6) and an inner radial surface 732 (FIG. 5) of the second portion 716.

Additionally, in the illustrated example of FIGS. 6-7, the third portion 718 of the locking lug 214 includes an axially shortened section 734 that has a reduced span in the axial direction A relative to the first portion 604 and/or the second portion 716 to reduce the mass per unit of distance spanned in the circumferential direction C (e.g., mass per circumferential span) of the third portion 718. That is, the first portion 604 and the second portion 716 at least partially span a greater distance than the third portion 718 in the axial direction A. In some examples, the reduced mass per circumferential span of the third portion 718 is configured in a different manner. For example, the third portion 718 can have a radially inward facing surface (FIG. 5) of the third portion 718. Accordingly, the locking lug 214 is asymmetric on opposite circumferential sides of the set screw axis 714 (e.g., on opposite sides of a geometric plane that includes the set screw axis 714 and spans in the axial direction A) to configure the center of gravity 724 of the locking lug 214 to align with the set screw axis 714 while enabling the second portion 716 and the third portion 718 to span different distances in the circumferential direction C. As such, an engagement between the locking lug 214 and the first dovetail 208A and the second dovetail 208B is asymmetric relative to the set screw axis 714 and/or the centerline 806 between the dovetails 208A, 208B. The locking lug 214 can be symmetric on opposite axial sides of the set screw axis 714 (e.g., on opposite sides of a geometric plane that includes the set screw axis 714 and spans in the circumferential direction C) to position the center of gravity 724 at a midpoint of the first portion 604 in the axial direction A. The symmetry on the opposite axial sides of the set screw axis 714 prevents the locking lug from encountering a moment that would otherwise act against the first end 608 and/or the second end 610 in the axial direction A.

Figure 9:
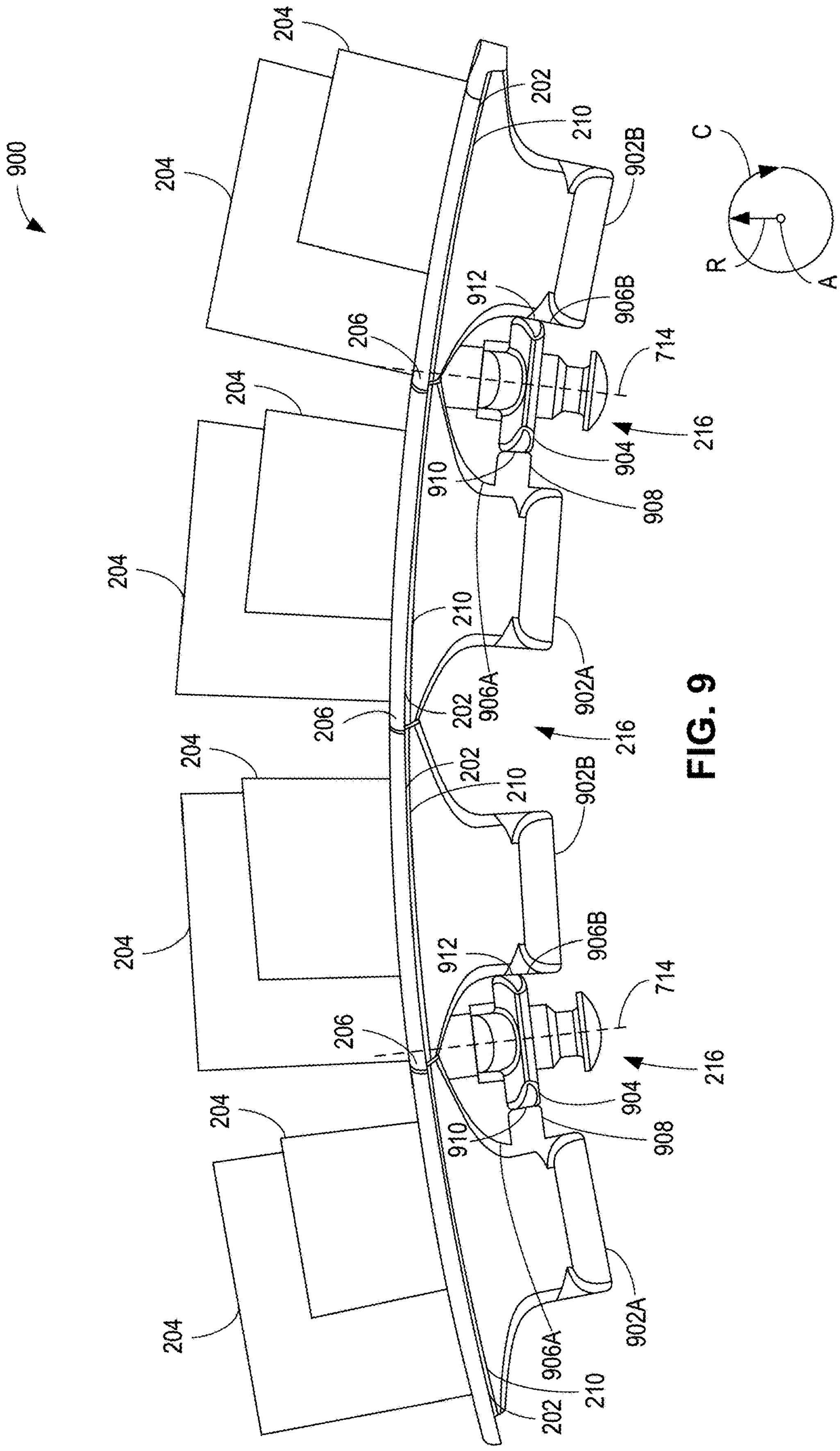
FIG. 9 shows a forward-looking-aft view of a portion of another example blade locking assembly that can be implemented in the engine of FIG. 1.

FIG. 9 is a forward-looking-aft view of a portion of another example blade locking assembly 900 that can be implemented in the engine 100 of FIG. 1. The blade locking assembly 900 includes the plurality of platforms 202 and the blades 204 extending from the outer radial surfaces 206 of the platforms 202. Further, blade locking assembly 900 includes first dovetails 902A and second dovetails 902B extending from the inner radial surfaces 210 of the platforms 202 and locking lugs 904 in contact with the dovetails 902A, 902B.

In the illustrated example of FIG. 9, the locking lugs 904 include the set screw axis 714, which is aligned with the platform opening geometric plane 810 (FIG. 8) and offset from the centerline 806 (FIG. 8). In this example, the locking lugs 904 are symmetric on opposite sides of the set screw axis 714 in the circumferential direction C. The dovetails 902A, 902B include circumferential surfaces 906A, 906B face opposite directions along the circumferential direction C (e.g., clockwise and counterclockwise) and, thus, face each other. In this example, to enable the platform opening geometric plane 810 and the set screw axis 714 to be offset from the centerline 806, the first dovetail 902A includes a circumferential projection 908 (e.g., a protrusion) in the circumferential surface 906A. The circumferential projection 908 is positioned at a same radial distance (e.g., a same distance from the axial centerline axis 108) as the locking lug 904 and contacts a first circumferential surface 910 of the locking lug 904. The circumferential surface 906B of the second dovetail 902B contacts a second circumferential surface 912 of the locking lug 904. As a result, an engagement between the locking lug 214 and the first dovetail 208A and the second dovetail 208B is asymmetric relative to the set screw axis 714 and/or the centerline 806 between the dovetails 208A, 208B. Further, with the locking lug 904 being symmetric on opposite sides of the set screw axis 714 in the circumferential direction C, the locking lug 904 is evenly loaded on opposite sides of the set screw axis 714 such that the locking lug 904 does not shift during operation.

In some examples, to inhibit a center of gravity of the dovetail 902A from encountering a force imbalance that would dislodge the dovetail 902A when rotating, the circumferential projection 908 is mirrored on an opposite circumferential surface 906C of the dovetail 902A. In some examples, to balance the center of gravity of the dovetail 902A, a recess is defined in the circumferential surface 906A. In some examples, to balance the center of gravity of the dovetail 902A, a portion of the circumferential surface 906A outside of the circumferential projection 908 has a reduced extension into the gap 216 (e.g., an increased separation from the centerline 806 (FIG. 8)) relative to the circumferential surface 218B (FIG. 2) that the third portion 718 of the locking lug 214 contacts in FIGS. 2-3 and 5.

In some examples, a turbine engine in accordance with teachings disclosed herein includes means for producing aerodynamic forces. For example, the means for producing aerodynamic forces can be implemented by the blades 204 of FIGS. 2-4 and 8-9.

In some examples, the turbine engine in accordance with teachings disclosed herein includes means for defining an inner radial surface of a flow path. For example, the means for defining the inner radial surface can be implemented by the platforms 202 of FIGS. 2-5 and 8-9.

In some examples, the turbine engine in accordance with teachings disclosed herein includes means for rotating the means for defining and the means for producing. For example, the means for rotating can be implemented by the HP shaft 126 and/or the LP shaft 128 of FIG. 1.

In some examples, the turbine engine in accordance with teachings disclosed herein includes means for coupling the means for producing and the means for defining to the means for rotating. For example, the means for coupling can be implemented by the dovetails 208, 208A, 208B of FIGS. 2-5 and 8 and/or the dovetails 902A, 902B of FIG. 9.

In some examples, the turbine engine in accordance with teachings disclosed herein includes means for asymmetrically splitting a circumferential space between the means for coupling. For example, the means for asymmetrically splitting may be implemented by the locking lugs 214 of FIGS. 2-7 and/or the circumferential projection 908 of FIG. 9.

From the foregoing, it will be appreciated that example systems, apparatus, articles of manufacture, and methods have been disclosed that enable circumferential edges of adjacent blade platforms to meet at a circumferential position that unevenly divides a circumferential gap between dovetails extending radially inward from the blade platforms. As such, examples disclosed herein provide flexibility in circumferential clocking of a blade(s) extending from the platform. Further, examples disclosed herein avoid modifications to rotor discs, to which the dovetails couple, to enable desired clocking to be obtained.

Asymmetric blade locking apparatus are disclosed herein. Further examples and combinations thereof include the following:

An apparatus comprising a first platform including a first inner radial surface, a first outer radial surface, and a first circumferential edge, a first dovetail extending from the first inner radial surface, a first blade extending from the first outer radial surface, a second platform including a second inner radial surface, a second outer radial surface, and a second circumferential edge, the second circumferential edge adjacent the first circumferential edge, a second dovetail extending from the second inner radial surface, a second blade extending from the second outer radial surface, and a locking lug including a radial hole to receive a screw to be positioned between the first circumferential edge and the second circumferential edge in a circumferential direction, the locking lug including a first circumferential surface and a second circumferential surface, the first circumferential surface in contact with the first dovetail, the second circumferential surface in contact with the second dovetail, the first circumferential surface positioned closer than the second circumferential surface to the radial hole in the circumferential direction.

The apparatus of any preceding clause, wherein the locking lug includes a first portion extending from the radial hole to the first circumferential surface, wherein the locking lug includes a second portion extending from the radial hole to the second circumferential surface, and wherein the second portion of the locking lug has a reduced mass per unit of circumferential span relative to the first portion.

The apparatus of any preceding clause, wherein the second portion of the locking lug includes an indent or is at least partially hollow to reduce a mass of the second portion per unit of circumferential span.

The apparatus of any preceding clause, wherein the locking lug includes the indent in an outer radial surface of the second portion.

The apparatus of any preceding clause, wherein the first portion of the locking lug spans a greater distance than the second portion in an axial direction.

The apparatus of any preceding clause, wherein the locking lug includes a radially outward projection positioned around the radial hole.

The apparatus of any preceding clause, wherein the first platform includes a third blade extending from the first outer radial surface.

A turbine engine comprising a circumferential row of platforms, blades extending radially outward from the platforms, dovetails extending radially inward from the platforms, the dovetails including a first dovetail and a second dovetail adjacent the first dovetail, and locking lugs including an orifice to receive a screw, the locking lugs including a first portion and a second portion, wherein the first portion spans from the orifice to a first end of the locking lug in a circumferential direction, wherein the second portion spans from the orifice to a second end of the locking lug in the circumferential direction, wherein the first end contacts the first dovetail, wherein the second end contacts the second dovetail, and wherein the first portion of the locking lug spans a greater distance than the second portion in the circumferential direction.

The turbine engine of any preceding clause, wherein the second portion is heavier per unit of circumferential span than the first portion.

The turbine engine of any preceding clause, wherein the first portion includes a recess to reduce a mass of the first portion per unit of circumferential span relative to the second portion.

The turbine engine of any preceding clause, wherein the recess is defined in an outer radial surface of the first portion.

The turbine engine of any preceding clause, wherein the first portion is at least partially hollow to reduce a mass of the first portion per unit of circumferential span relative to the second portion.

The turbine engine of any preceding clause, wherein the second portion spans a greater distance than the first portion in an axial direction defined by the turbine engine.

The turbine engine of any preceding clause, wherein the locking lugs include a radially outward projection positioned around the orifice.

An apparatus comprising a first platform including a first inner radial surface, a first outer radial surface, and a first circumferential edge, a first dovetail extending from the first inner radial surface, a first blade extending from the first outer radial surface, a second platform including a second inner radial surface, a second outer radial surface, and a second circumferential edge, the second circumferential edge adjacent the first circumferential edge, a second dovetail extending from the second inner radial surface, a second blade extending from the second outer radial surface, and a locking lug including a radial hole to receive a screw to be positioned between the first circumferential edge and the second circumferential edge in a circumferential direction, wherein the locking lug contacts the first dovetail and the second dovetail, and wherein an engagement between the locking lug and the first dovetail and the second dovetail is asymmetric.

The apparatus of any preceding clause, wherein the locking lug includes a radially outward projection positioned around the radial hole.

The apparatus of any preceding clause, wherein the radially outward projection is separated from the first dovetail and the second dovetail by different distances in the circumferential direction at a radius defined by the radially outward projection.

The apparatus of any preceding clause, wherein the first dovetail includes a circumferential projection that contacts the locking lug.

The apparatus of any preceding clause, wherein the locking lug includes a first portion extending from the radial hole to a first circumferential surface of the locking lug that contacts the first dovetail, wherein the locking lug includes a second portion extending from the radial hole to a second circumferential surface of the locking lug that contacts the second dovetail, and wherein the first portion spans a greater distance in the circumferential direction than the second portion.

The apparatus of any preceding clause, wherein the radially outward projection is separated from the first dovetail and the second dovetail by different distances in the circumferential direction at a radius defined by the radially outward projection.

The apparatus of any preceding clause, wherein the second portion includes a recess to reduce a mass of the second portion per unit of circumferential span relative to the first portion.

The apparatus of any preceding clause, wherein the second portion is at least partially hollow to reduce a mass of the second portion per unit of circumferential span relative to the first portion.

The apparatus of any preceding clause, wherein the first blade and the second blade form a portion of a row of annular rotor blades in a turbine engine.

The apparatus of any preceding clause, wherein the first dovetail includes a third circumferential surface that contacts the first circumferential surface, wherein the second dovetail includes a fourth circumferential surface that contacts the second circumferential surface, wherein the first circumferential surface defines a first geometric plane (802), wherein the second circumferential surface defines a second geometric plane (804), wherein a centerline (806) evenly divides an arc between the first geometric plane and the second geometric plane, wherein the screw is aligned along a set screw axis (714) positioned closer than the centerline to the first geometric plane.

The apparatus of any preceding clause, wherein the set screw axis is positioned at least 10% of a span of the arc from the centerline.

The apparatus of any preceding clause, wherein the set screw axis is positioned at least 10% of a span of the arc from the first geometric plane.

The apparatus of any preceding clause, wherein the locking lug is positioned in an opening (402) between the first platform and the second platform.

The apparatus of any preceding clause, wherein the first portion of the locking lug has a reduced mass per unit of circumferential span relative to the second portion.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:

a first platform including a first inner radial surface, a first outer radial surface, and a first circumferential edge, a first dovetail extending from the first inner radial surface, a first blade extending from the first outer radial surface;

a second platform including a second inner radial surface, a second outer radial surface, and a second circumferential edge, the second circumferential edge adjacent the first circumferential edge, a second dovetail extending from the second inner radial surface, a second blade extending from the second outer radial surface; and a locking lug including a radial hole to receive a screw to be positioned between the first circumferential edge and the second circumferential edge in a circumferential direction, the locking lug including a first circumferential surface and a second circumferential surface, the first circumferential surface in contact with the first dovetail, the second circumferential surface in contact with the second dovetail, the first circumferential surface positioned closer than the second circumferential surface to the radial hole in the circumferential direction, wherein the locking lug includes a first portion extending from the radial hole to the first circumferential surface, wherein the locking lug includes a second portion extending from the radial hole to the second circumferential surface, and wherein the second portion of the locking lug has a reduced mass per unit of circumferential span relative to the first portion.

2. The apparatus of claim 1, wherein the second portion of the locking lug includes an indent or is at least partially hollow to reduce a mass of the second portion per unit of circumferential span.

3. The apparatus of claim 2, wherein the locking lug includes the indent in an outer radial surface of the second portion.

4. The apparatus of claim 1, wherein the first portion of the locking lug spans a greater distance than the second portion in an axial direction.

5. The apparatus of claim 1, wherein the locking lug includes a radially outward projection positioned around the radial hole.

6. The apparatus of claim 1, wherein the first platform includes a third blade extending from the first outer radial surface.

7. A turbine engine comprising:

a circumferential row of platforms;

blades extending radially outward from the platforms;

dovetails extending radially inward from the platforms, the dovetails including a first dovetail and a second dovetail adjacent the first dovetail; and a locking lug including an orifice to receive a screw, the locking lug including a first portion and a second portion, wherein the first portion spans from the orifice to a first end of the locking lug in a circumferential direction, wherein the second portion spans from the orifice to a second end of the locking lug in the circumferential direction, wherein the first end contacts the first dovetail, wherein the second end contacts the second dovetail, and wherein the first portion of the locking lug spans a greater distance than the second portion in the circumferential direction, wherein the second portion spans a greater distance than the first portion in an axial direction defined by the turbine engine.

8. The turbine engine of claim 7, wherein the second portion is heavier per unit of circumferential span than the first portion.

9. The turbine engine of claim 8, wherein the first portion includes a recess to reduce a mass of the first portion per unit of circumferential span relative to the second portion.

10. The turbine engine of claim 9, wherein the recess is defined in an outer radial surface of the first portion.

11. The turbine engine of claim 8, wherein the first portion is at least partially hollow to reduce a mass of the first portion per unit of circumferential span relative to the second portion.

12. The turbine engine of claim 7, wherein the locking lugs include lug includes a radially outward projection positioned around the orifice.

13. An apparatus comprising:

a first platform including a first inner radial surface, a first outer radial surface, and a first circumferential edge, a first dovetail extending from the first inner radial surface, a first blade extending from the first outer radial surface;

a second platform including a second inner radial surface, a second outer radial surface, and a second circumferential edge, the second circumferential edge adjacent the first circumferential edge, a second dovetail extending from the second inner radial surface, a second blade extending from the second outer radial surface; and a locking lug including a radial hole to receive a screw to be positioned between the first circumferential edge and the second circumferential edge in a circumferential direction, wherein the locking lug contacts the first dovetail and the second dovetail, wherein an engagement between the locking lug and the first dovetail is different from an engagement between the locking lug and the second dovetail, wherein the locking lug includes a first portion extending from the radial hole to a first circumferential surface of the locking lug that contacts the first dovetail, wherein the locking lug includes a second portion extending from the radial hole to a second circumferential surface of the locking lug that contacts the second dovetail, and wherein the first portion spans a greater distance in the circumferential direction than the second portion, wherein the first portion of the locking lug has a reduced mass per unit of circumferential span relative to the second portion.

14. The apparatus of claim 13, wherein the locking lug includes a radially outward projection positioned around the radial hole.

15. The apparatus of claim 14, wherein the radially outward projection is separated from the first dovetail and the second dovetail by different distances in the circumferential direction at a radius defined by the radially outward projection.

16. The apparatus of claim 15, wherein the first dovetail includes a circumferential projection that contacts the locking lug.

* * * * *